US011606402B2

(12) United States Patent
Sodagar

(10) Patent No.: US 11,606,402 B2
(45) Date of Patent: *Mar. 14, 2023

(54) SPLIT RENDERING USING NETWORK BASED MEDIA PROCESSING WORKFLOW

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/677,096

(22) Filed: Feb. 22, 2022

(65) Prior Publication Data

US 2022/0182431 A1   Jun. 9, 2022

Related U.S. Application Data

(63) Continuation of application No. 17/205,240, filed on Mar. 18, 2021, now Pat. No. 11,297,121.

(60) Provisional application No. 63/087,741, filed on Oct. 5, 2020, provisional application No. 63/087,742, filed on Oct. 5, 2020, provisional application No. 63/006,207, filed on Apr. 7, 2020.

(51) Int. Cl.
*G06F 15/16* (2006.01)
*H04L 65/60* (2022.01)
*H04L 67/10* (2022.01)

(52) U.S. Cl.
CPC .............. *H04L 65/60* (2013.01); *G06F 15/16* (2013.01); *H04L 67/10* (2013.01)

(58) Field of Classification Search
CPC .......... H04L 65/60; H04L 67/10; G06F 15/16
USPC ........................................................ 709/201
See application file for complete search history.

(56) References Cited

U.S. PATENT DOCUMENTS

| 8,015,564 B1* | 9/2011 | Beyer ..................... G06F 9/505 |
| | | 718/103 |
| 8,332,862 B2* | 12/2012 | Isard ...................... G06F 8/433 |
| | | 709/201 |
| 9,684,706 B2* | 6/2017 | Satzke .................. G06F 9/5066 |
| 10,873,614 B2* | 12/2020 | Kolan ..................... H04L 69/40 |
| 10,924,775 B2* | 2/2021 | Lo ......................... H04N 21/239 |

(Continued)

OTHER PUBLICATIONS

"Potential improvements of ISO/IEC 23090-8 Network-based Media Processing", ISO/IEC JTC 1/SC 29/WG 11 N19062, Jan. 2020, Brussels, BE, 192 pages.

(Continued)

*Primary Examiner* — Alicia Baturay
(74) *Attorney, Agent, or Firm* — Sughrue Mion, PLLC

(57) ABSTRACT

Systems and methods for split rendering of Network Based Media Processing (NBMP) are provided. A method includes deriving a network based media processing (NBMP) workflow, and assigning a plurality of workflow tasks of the NBMP workflow among a media sink, a media source, and at least one cloud element, network element, or edge element. A first subset of the plurality of the workflow tasks are assigned to the media source, a second subset of the plurality of the workflow tasks are assigned to the media sink, and a third subset of the plurality of the workflow tasks are assigned to the at least one cloud element, network element, or edge element. The first subset, the second subset, and the third subset do not overlap with each other.

20 Claims, 9 Drawing Sheets

(56) References Cited

U.S. PATENT DOCUMENTS

| | | | |
|---|---|---|---|
| 11,063,992 B1* | 7/2021 | Sodagar | H04L 67/146 |
| 11,256,546 B2* | 2/2022 | You | G06F 9/5027 |
| 11,277,598 B2* | 3/2022 | Hinds | H04L 65/612 |
| 11,297,121 B2* | 4/2022 | Sodagar | H04L 67/1097 |
| 11,297,122 B2* | 4/2022 | Sodagar | H04L 67/51 |
| 11,356,534 B2* | 6/2022 | Sodagar | H04N 21/64784 |
| 11,496,414 B2* | 11/2022 | Sodagar | H04L 65/1069 |
| 11,496,532 B2* | 11/2022 | Kolan | H04L 65/1059 |
| 11,496,608 B2* | 11/2022 | Sodagar | H04L 67/1021 |
| 2011/0067030 A1 | 3/2011 | Isard et al. | |
| 2015/0066929 A1 | 3/2015 | Satzke et al. | |
| 2016/0148158 A1 | 5/2016 | Marth et al. | |
| 2017/0103360 A1 | 4/2017 | Ristock et al. | |
| 2019/0028691 A1 | 1/2019 | Hinds et al. | |
| 2019/0222621 A1 | 7/2019 | Kolan et al. | |
| 2020/0304423 A1 | 9/2020 | Sodagar et al. | |
| 2020/0344323 A1 | 10/2020 | Sodagar | |
| 2020/0412788 A1* | 12/2020 | Sodagar | H04L 67/566 |
| 2020/0412837 A1* | 12/2020 | Sodagar | H04N 21/643 |
| 2021/0004273 A1 | 1/2021 | You et al. | |
| 2021/0096922 A1* | 4/2021 | Sodagar | G06F 9/505 |
| 2021/0099403 A1* | 4/2021 | Sodagar | H04L 49/90 |
| 2021/0105338 A1* | 4/2021 | Oyman | H04L 67/146 |
| 2021/0218787 A1 | 7/2021 | Sodagar | |
| 2021/0314371 A1 | 10/2021 | Sodagar | |
| 2021/0320955 A1 | 10/2021 | Kolan | |
| 2021/0320986 A1* | 10/2021 | Sodagar | H04L 67/10 |
| 2021/0320987 A1 | 10/2021 | Sodagar | |

OTHER PUBLICATIONS

Internal Search Report dated Jun. 30, 2021 from the International Searching Authority in International Application No. PCT/US2021/025552.

Written Opinion dated Jun. 30, 2021 from the International Searching Authority in International Application No. PCT/US2021/025552.

Extended European Search Report dated Aug. 30, 2022 in European Application No. 21783753.3.

\* cited by examiner

SPLIT RENDERING USING NETWORK BASED MEDIA PROCESSING WORKFLOW

CROSS-REFERENCE TO THE RELATED APPLICATIONS

This application is a Continuation of U.S. application Ser. No. 17/205,240, filed Mar. 18, 2021, which claims priority from U.S. Provisional Application No. 63/006,207, filed on Apr. 7, 2020; U.S. Provisional Application No. 63/087,741, filed on Oct. 5, 2020; and U.S. Provisional Application No. 63/087,742, filed on Oct. 5, 2020; the disclosures of which are incorporated herein by reference in their entirety.

FIELD

Embodiments of the present disclosure are directed to Moving Picture Experts Group (MPEG) Network Based Media Processing (NBMP) and, more particularly, to split rendering using NBMP workflow.

BACKGROUND

MPEG Network Based Media Processing (NBMP) project has developed a concept of processing media on cloud. However, current NBMP design does not provide any solution for split rendering.

Network and cloud platforms are used to run various applications. However, there is no standard based solution to describe the characteristics of a media source or sink device/platform in terms of computational and storage resources, no method to describe the connection characteristics between two cloud nodes, and no method to discover the capabilities of network elements.

SUMMARY

The NBMP Draft International Specification shows a great potential to increase media processing efficiency, to provide faster and lower-cost deployment of media services, and to have the ability to provide large scale deployment by leveraging public, private, or hybrid cloud services.

Embodiments of the present disclosure provide a mechanism to implement split-rendering in the NBMP standard.

Split-rendering allows splitting the processing into various subprocesses, some of which may be implemented on the cloud or edge computing, while the rest is implemented on a device. A media workflow can be split this way, thereby allowing devices with low computational capabilities or that are low in power to be able to receive media content since some of the processing load is taken away from the device and is supported by cloud/edge resources.

Embodiments of the present disclosure improve the network based media processing (NBMP) standard to describe capabilities of a media source or media sink device/platform in terms of computational and storage resources, and defines a set of Application Programming Interfaces (APIs) to perform a corresponding discovery function.

Embodiments of the present disclosure extend the NBMP APIs to provide discovery of cloud node and network capabilities. Embodiments of the present disclosure improve the NBMP standard to describe connection characteristics between two NBMP MPEs (e.g. cloud nodes).

According to one or more embodiments, a method performed by at least one processor is provided. The method includes: deriving a network based media processing (NBMP) workflow; and assigning a plurality of workflow tasks of the NBMP workflow among a media sink, a media source, and at least one cloud element, network element, or edge element, wherein a first subset of the plurality of the workflow tasks are assigned to the media source, wherein a second subset of the plurality of the workflow tasks are assigned to the media sink, wherein a third subset of the plurality of the workflow tasks are assigned to the at least one cloud element, network element, or edge element, and wherein the first subset, the second subset, and the third subset do not overlap with each other.

According to an embodiment, the method further includes: receiving capabilities information from at least one from among the media source and the media sink, wherein the capabilities information describes resources of the at least one from among the media source and the media sink that are available, wherein the assigning includes assigning the workflow tasks based on the capabilities information.

According to an embodiment, the method further includes: reconfiguring the NBMP workflow based on a change of at least one of the resources of the at least one from among the media source and the media sink.

According to an embodiment, the method further includes: receiving an event-driven notification from the media source or the media sink in a case where the at least one of the resources associated with the at least one from among the media source and the media sink is reduced below a predetermined threshold, wherein the reconfiguring the NBMP workflow accommodates the at least one of the resources that is reduced.

According to an embodiment, the at least one cloud element, network element, or edge element is a plurality of network elements or a plurality of cloud nodes, the assigning includes dividing the third subset of the plurality of the workflow tasks of the NBMP workflow between the plurality of network elements or the plurality of cloud nodes based on capabilities of the plurality of network elements or of the plurality of cloud nodes, and the method further includes dynamically reconfiguring the NBMP workflow based on a change in availability of the plurality of network elements or of the plurality of cloud nodes.

According to an embodiment, the method further includes: receiving capabilities information from the at least one cloud element, network element, or edge element, wherein the capabilities information describes available resources of the at least one cloud element, network element, or edge element, wherein the assigning includes assigning the workflow tasks based on the capabilities information.

According to an embodiment, the at least one cloud element, network element, or edge element is at least one cloud node.

According to an embodiment, the at least one cloud element, network element, or edge element is a plurality of cloud elements, network elements, or edge elements, and the capabilities information includes at least one parameter that describes a connection characteristics between two of the plurality of cloud elements, network elements, or edge elements.

According to an embodiment, the plurality of cloud elements, network elements, or edge elements is a plurality of cloud nodes.

According to an embodiment, the at least one parameter is a set of parameters that indicate a maximum bandwidth and a minimum latency in two directions between the two of the plurality of cloud elements, network elements, or edge elements.

According to one or more embodiments, a workflow manager of a media system is provided. The workflow manager includes: at least one processor; and memory including computer code. The computer code includes: workflow deriving code configured to cause the at least one processor to derive a network based media processing (NBMP) workflow; and task assigning code configured to cause the at least one processor to assign a plurality of workflow tasks of the NBMP workflow among a media sink, a media source, and at least one cloud element, network element, or edge element, wherein a first subset of the plurality of the workflow tasks are assigned to the media source, wherein a second subset of the plurality of the workflow tasks are assigned to the media sink, wherein a third subset of the plurality of the workflow tasks are assigned to the at least one cloud element, network element, or edge element, and wherein the first subset, the second subset, and the third subset do not overlap with each other.

According to an embodiment, the task assigning code is configured to cause to the at least one processor to assign the workflow tasks based on capabilities information that is received from at least one from among the media source and the media sink, and the capabilities information describes resources of the at least one from among the media source and the media sink that are available.

According to an embodiment, the computer code further includes: workflow reconfiguring code configured to cause the at least one processor to reconfigure the NBMP workflow based on a change of at least one of the resources of the at least one from among the media source and the media sink.

According to an embodiment, the workflow reconfiguring code is configured to cause the at least one processor to reconfigure the NBMP workflow to accommodate reduction of the at least of the resources based on receiving an event-driven notification from the media source or the media sink in a case where the at least one of the resources associated with the at least one from among the media source and the media sink is reduced below a predetermined threshold.

According to an embodiment, the at least one cloud element, network element, or edge element is a plurality of network elements or a plurality of cloud nodes, the task assigning code is configured to cause the at least one processor to divide the third subset of the plurality of the workflow tasks of the NBMP workflow between the plurality of network elements or the plurality of cloud nodes based on capabilities of the plurality of network elements or of the plurality of cloud nodes, and the workflow reconfiguring code is configured to cause the at least one processor to dynamically reconfigure the NBMP workflow based on a change in availability of the plurality of network elements or of the plurality of cloud nodes.

According to an embodiment, the task assigning code is configured to cause the at least one processor to assign the workflow tasks based on capabilities information that is received from the at least one cloud element, network element, or edge element, and the capabilities information describes available resources of the at least one cloud element, network element, or edge element.

According to an embodiment, the at least one cloud element, network element, or edge element is at least one cloud node.

According to an embodiment, the at least one cloud element, network element, or edge element is a plurality of cloud elements, network elements, or edge elements, and the capabilities information includes at least one parameter that describes a connection characteristics between two of the plurality of cloud elements, network elements, or edge elements.

According to an embodiment, the at least one parameter is a set of parameters that indicate a maximum bandwidth and a minimum latency in two directions between the two of the plurality of cloud elements, network elements, or edge elements.

According to one or more embodiments, a non-transitory computer-readable medium storing computer code is provided. The computer code is configured to, when executed by at least one processor that implements a workflow manager of a media system, cause the at least one processor to: derive a network based media processing (NBMP) workflow; and assign a plurality of workflow tasks of the NBMP workflow among a media sink, a media source, and at least one cloud element, network element, or edge element, wherein a first subset of the plurality of the workflow tasks are assigned to the media source, wherein a second subset of the plurality of the workflow tasks are assigned to the media sink, wherein a third subset of the plurality of the workflow tasks are assigned to the at least one cloud element, network element, or edge element, and wherein the first subset, the second subset, and the third subset do not overlap with each other.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
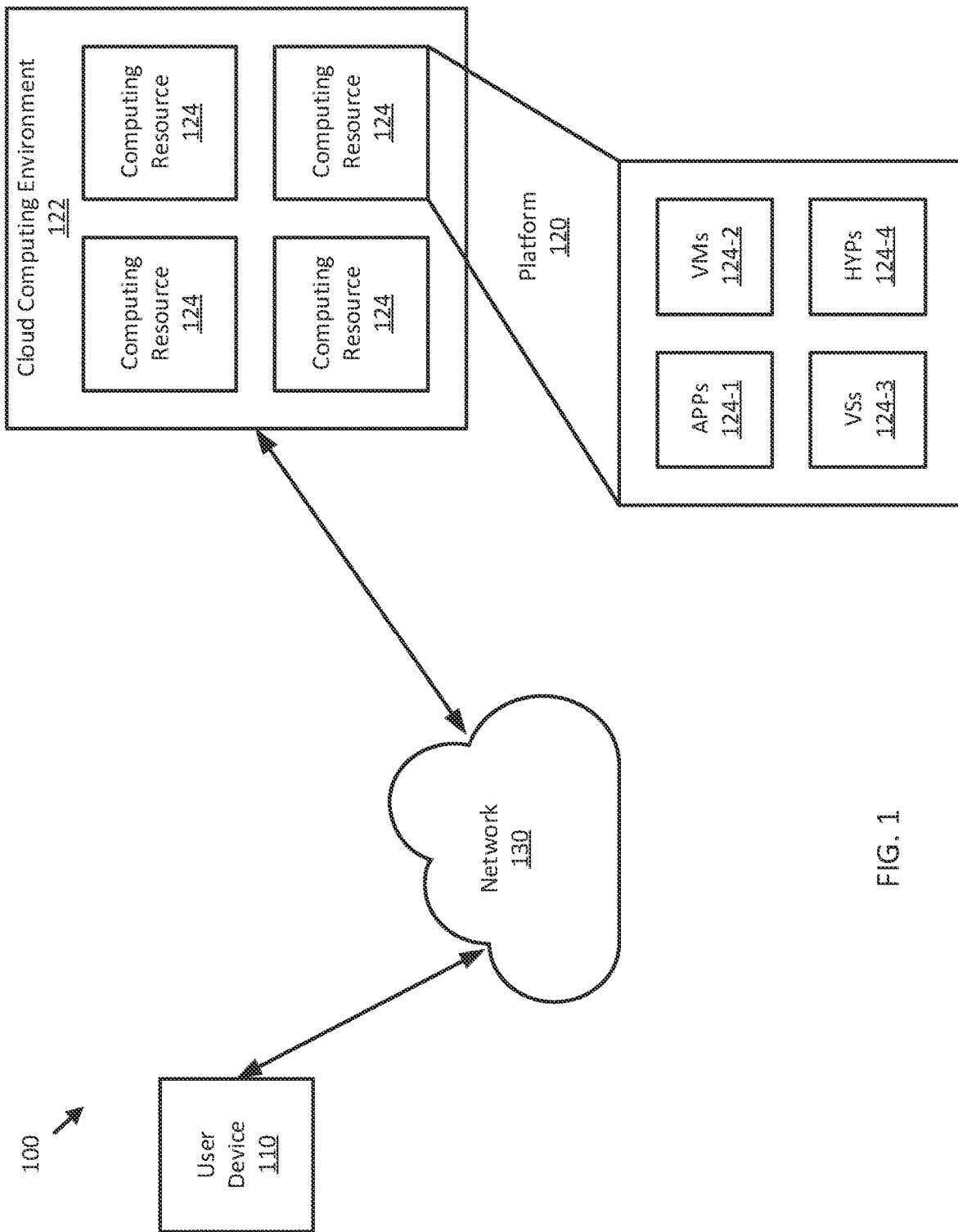
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
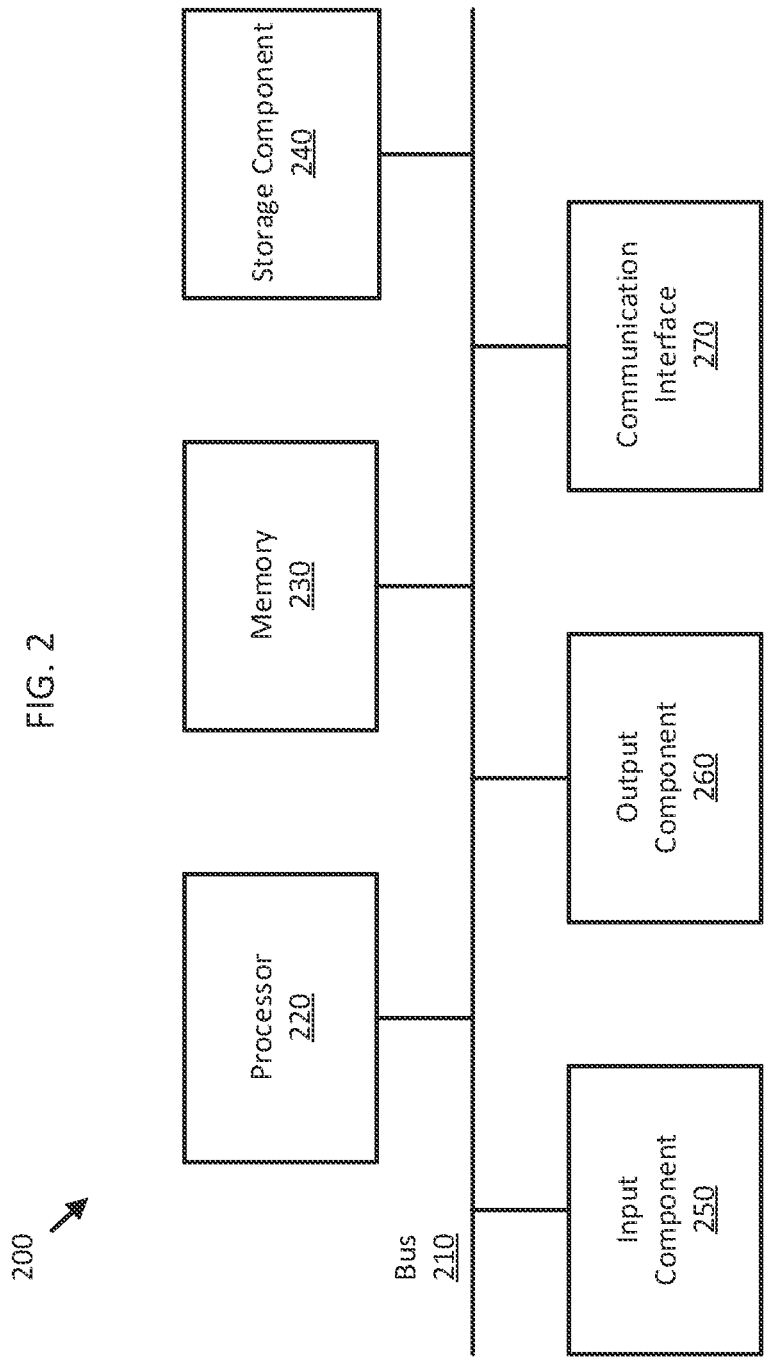
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
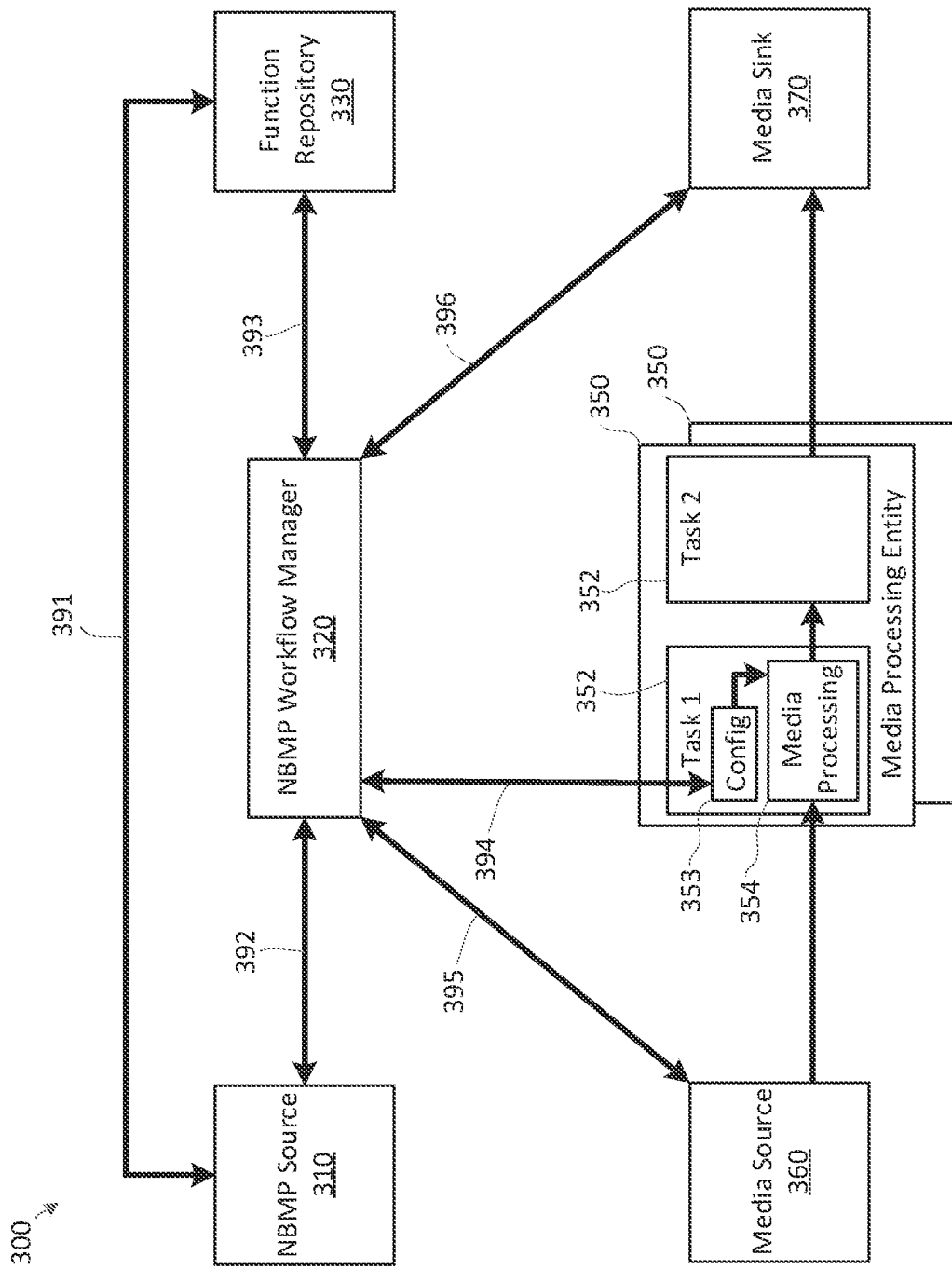
FIG. 3 is a block diagram of an NBMP system according to embodiments

In an embodiment of the present disclosure, an NBMP system 300 is provided. With reference to FIG. 3, the NBMP system 300 comprises an NBMP source 310, an NBMP workflow manager 320, a function repository 330, one or more media processing entities 350, a media source 360, and a media sink 370.

The NBMP source 310 may receive instructions from a third party entity, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may comprise or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an API 394 (e.g. an NBMP task API). The NBMP workflow manager 320 may comprise or be implemented by at least one processor and memory that stores code configured to cause the at least processor to perform the functions of the NBMP workflow manager 320.

The NBMP workflow manager 320 may use the API 394 to setup, configure, manage, and monitor one or more tasks 352 of a workflow that is performable by the one or more media processing entities 350. In an embodiment, the NBMP workflow manager 320 may use the API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each comprise or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may comprise or be implemented by at least one processor and at least one display that is configured to display the media that is processed by the one or more media processing entities 350.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

Figure 4:
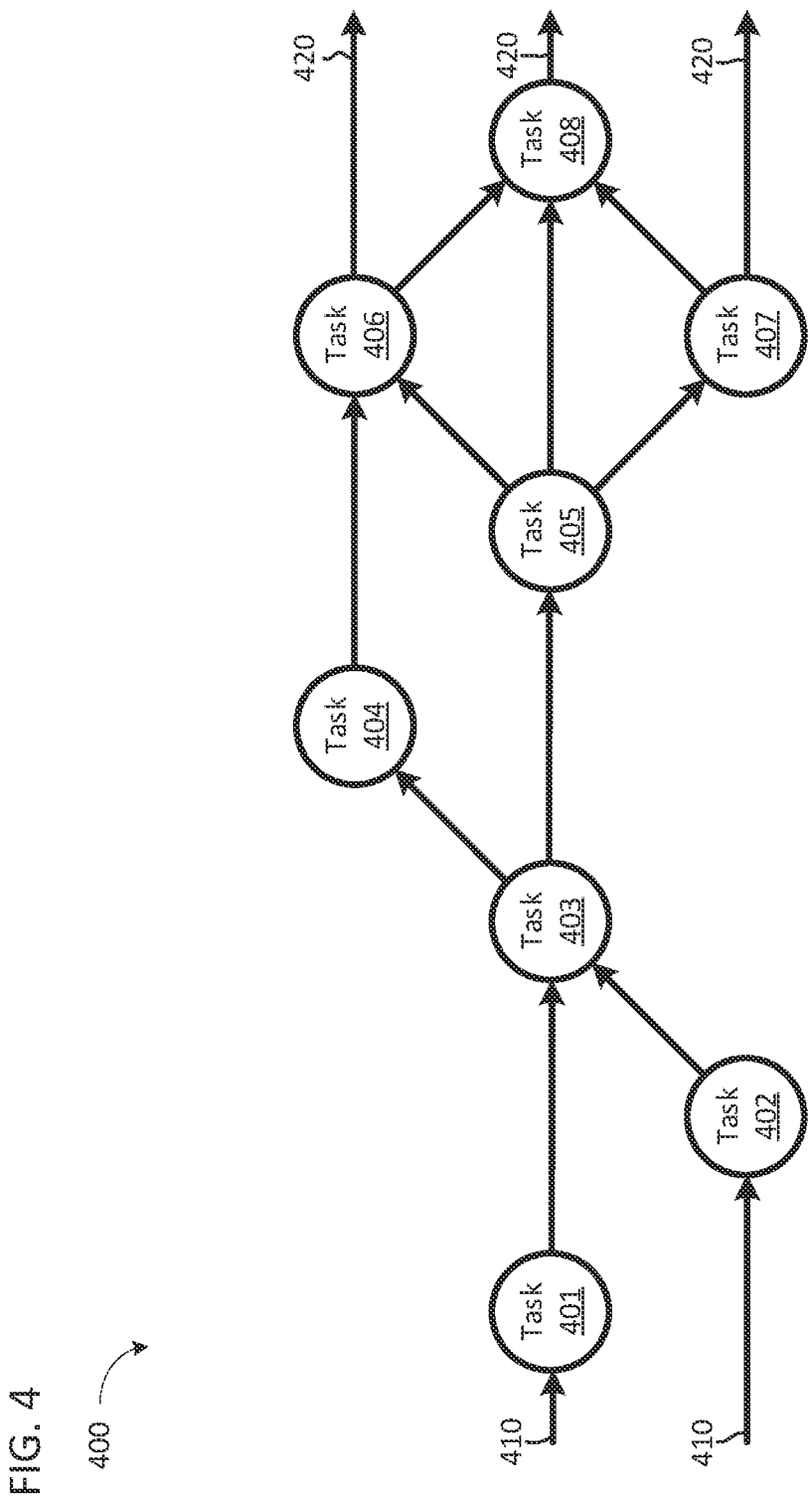
FIG. 4 is a diagram of an example NBMP workflow according to embodiments.

According to an embodiment, the NBMP system 300 may be configured to perform split rendering. For example, with reference to FIG. 4, the NBMP workflow manager 320 may create and manage an NBMP workflow 400 that includes one or more tasks (e.g. tasks 401-408). For example, as shown in FIG. 4, the tasks 401-408 may be associated with various inputs 410 and may be configured to provide various outputs 420.

Figure 5:
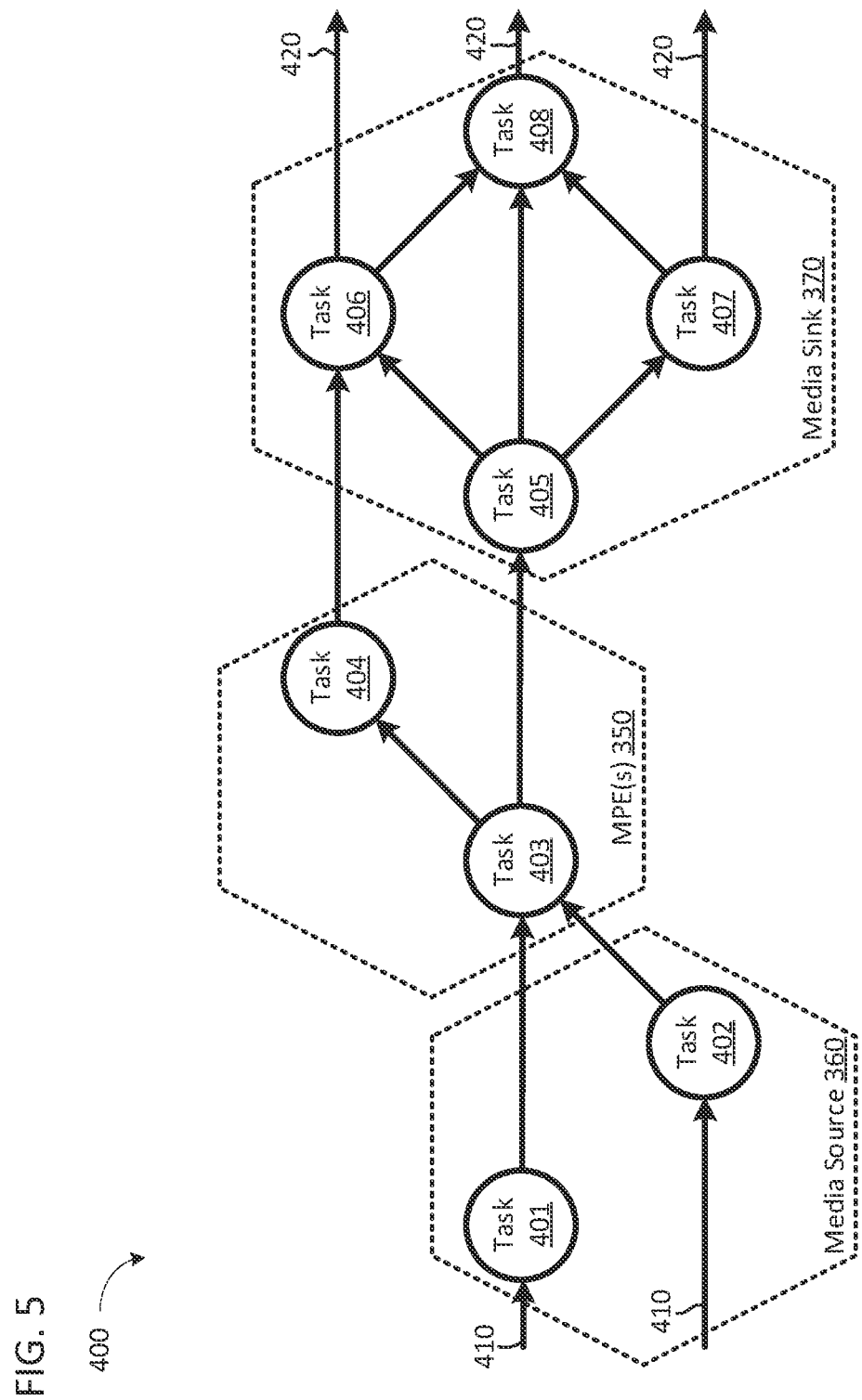
FIG. 5 is a diagram of an example of split rendering of an NBMP workflow according to embodiments.

In split-rendering, some of the tasks of a workflow may be implemented in the media source 360 and/or the media sink 370. For example, FIG. 5 shows an example of split-rendering of the tasks 401-408 illustrated in FIG. 4 between the media source 360, one or more MPE 350, and the media sink 370. In embodiments, the media source 360 may be a source device/platform, the one or more MPE 350 may be a cloud node/edge network, and the media sink 370 may be a sink device/platform.

As shown in FIG. 5, tasks 401-402 are implemented on the media source 360, tasks 403-404 are implemented on the one or more MPE 350, and tasks 405-408 are implemented by the media sink 370.

To accommodate split-rendering in NBMP, the NBMP system 300 may implement the following new features to the NBMP standard.

[Sink and Source Capabilities Description]

A new description document (e.g. a capabilities description document) may be defined using NBMP descriptors which describes one or more capabilities of a media source 360 or a media sink 370. The NBMP workflow manager 320 may obtain one or more of the description document from the media source 360 or the media sink 370 of which the description document describes capabilities, or may obtain the one or more description documents from another component of the NBMP system 300 (e.g. from one or more MPEs 350). As an example, the workflow manager 320 may obtain the one or more description documents from one or more APIs (e.g. API 394, API 395, and/or API 396) as illustrated in FIG. 3. The capabilities described may include the following:

1. Name, description, and identifier
2. The repository of built-in functions and optionally the resource requirements
3. Total and currently available hardware resources including processing, memory and disk space
4. Currently available throughput and latency capabilities
5. Current available battery/power
6. Issuing events in case of reducing resource The NBMP descriptors of the description document may include the following descriptors:

1. Scheme Descriptor
2. General Descriptor
3. Repository Descriptor
4. List of supported functions
5. Requirements
6. System events

[Discovery of MPE Capabilities]

Embodiments of the present disclosure may extend the NBMP APIs to provide MPE (e.g. cloud node) capabilities discovery using a representational state transfer (REST)-ful API.

A. MPE Resources

Embodiments of the present disclosure may implement an MPE resource (MR) that is used for various MPE API operations. The MR may be a REST resource, which may be required to contain exactly one MPE Capabilities Description Document (MDD). The MR may be in JavaScript Object Notation (JSON) format. According to embodiments, with reference to FIG. 3, an MPE 350 may send the MDD to the NBMP workflow manager 320 via, for example, the API 394 as an MPE API.

B. MPE API Operations

Embodiments of the present disclosure may implement the MPE API. The MPE API may be used to discover the capabilities of one or more MPEs 350. An MPE 350 may support the MPE API operations shown below in TABLE 1.

According to embodiments, the NBMP workflow manager 320 may request the MPE API operations be performed via the MPE API, and at least one MPE 350 may provide a Response as indicated above in TABLE 1.

The included MDD in any response may include one "link" object, including a "ref" with value "self" and a Uniform Resource Locator (URL) according to IETF RFC3986 indicating the location of the MDD.

C. Supported Protocols

As shown below in TABLE 2, HTTP methods may be implemented by embodiments of the present disclosure for MPE discovery. According to embodiments, the HTTP methods may be performed by the NBMP workflow manager 320.

TABLE 2

| API | Operation | HTTP Method |
|---|---|---|
| NBMP Workflow API | CreateWorkflow | POST |
| | UpdateWorkflow | PATCH |
| | DeleteWorkflow | DELETE |

TABLE 1

| Operation | Description | Request Resource Requirements | Response Requirements |
|---|---|---|---|
| DeleteWorkflow | Terminate an existing workflow | WR with identical General's id, previously received in CreateWorkflow's response | If successful, may be required to include: HTTP status code 200<br>If failed, may be required to include:<br>1) HTTP status codes 4xx or 5xx<br>2) Optionally, response's body with updated WR signaling failed descriptors or parameters |
| RetrieveCapabilities | Retrieve Capabilities of MPE | MR with identical General's id | If successful, may be required to include:<br>1) HTTP status code 201<br>2) Response's body with updated MR including:<br>a) General descriptor's identical to the one in the request<br>b) Updated capability information<br>If failed, may be required to include:<br>1) HTTP status codes 4xx or 5xx<br>2) Optionally, response's body with updated MR signaling failed descriptors or parameters |
| RetrieveConnectivity | Retrieve Capabilities of MPE | MR with identical General's id and the connectivity parameters including the list of MPE's ids and optionally their IP addresses. | If successful, may be required to include:<br>3) HTTP status code 201<br>4) Response's body with updated MR including:<br>a) General descriptor's identical to the one in the request<br>b) Updated connectivity information<br>If failed, may be required to include:<br>3) HTTP status codes 4xx or 5xx<br>Optionally, response's body with updated MR signaling failed descriptors or parameters |

TABLE 2-continued

| API | Operation | HTTP Method |
|---|---|---|
| | RetrieveWorkflow | GET |
| | GetReports | GET |
| NBMP Task API | CreateTask | POST |
| | UpdateTask | PATCH |
| | GetTask | GET |
| | DeleteTask | DELETE |
| NBMP Function Discovery API | DiscoverFunctions | GET |
| | DiscoverFunctionsInGroup | GET |
| | DiscoverGroupsOfFunction | GET |
| MPE Discovery API | RetrieveCapabilities | GET |
| | RetrieveConnectivity | GET |

According to embodiments, a method for discovering of a cloud processing node's capabilities and connectivity to other cloud nodes may be provided by extending NBMP's RESTFUL APIs to support discovering MPE capabilities and connectivity to other MPEs, where the capabilities of an MPE can be discovered as well as the connectivity of the MPE to a specific set of MPEs can be requested and received.

[Description of Connectivity Between MPEs]

Embodiments of the present disclosure may implement a new NBMP Descriptor to define the connection characteristics between an MPE (e.g. a cloud processing node) and other MPEs (e.g. other cloud processing nodes).

The connection characteristics may be described with, for example, the following parameters: (1) maximum bandwidth between two MPEs in each direction, and (2) minimum latency between two MPEs in each direction.

These connection parameters may be defined as shown in TABLE 3 below.

TABLE 3

| Name | Definition | Unit | Type | Valid Range |
|---|---|---|---|---|
| min-delay | minimum delay i.e. minimum amount of time from the send time to receive time for this connection and this direction | millisecond | integer | unsigned integer |
| max-throughput | maximum bandwidth for this connection and this direction | bits/second | integer | unsigned integer |
| averaging-window | averaging window used to calculate the throughput. The default may be one second. | microsecond | integer | unsigned integer |

Since the connection is between two MPEs, the above parameters may be defined for each direction.

A. Connectivity Parameters in the MPE Capabilities Description

Embodiments of the present disclosure may implement a new set of parameters within the Capabilities Descriptor of the NBMP MPE Capabilities Description, as shown below in TABLE 4.

TABLE 4

| Descriptor | Additional constraints | Cardinality |
|---|---|---|
| Scheme | None | 0-1 |
| General | The 'id' may be required to be unique among all MPEs, including Source and Sink. Following parameters may be required to not be present: rank published-time priority execution-time input-ports output-ports is-group state | |
| Repository | None. The repositories may define the list of functions that are supported by the MPE. | 0-1 |
| Functions Capabilities (same descriptor as Requirements) | Array of supported Function Description. This descriptor may be used to describe the capabilities: 1. Flowcontrol defines the range of current capabilities | 0-1 |
| | 2. Connectivity between this MPE and other MPEs | 0-1 |
| | 3. Hardware defines the hardware capabilities 4. Security parameters defines the supported security features Following parameters may be required to not be present: Workflow/Task requirement parameters Resource estimator parameters | |
| Events | This descriptor may list events for source or sink in the case of reduced resource availability such as low cpu, low gpu, low memory, low bandwidth, low disk, low power. | 0-1 |

Cardinality: 1 = exactly one, 0-1 = zero or one

B. Connection Parameters within Requirements Descriptor

Since the Capabilities Descriptor may be the same descriptor as the Requirements Descriptor, embodiments of the present disclosure may implement the parameters shown below in TABLE 5 within the Requirement Descriptor (the Capabilities Descriptor).

TABLE 5

| Parameter Name | Description | Type | Cardinality |
|---|---|---|---|
| flowcontrol-requirements | flowcontrol requirements for the resource | O | 0-1 |
| connectivity parameters | connectivity parameters between the resource and other resources | O | 0-1 |
| hardware-requirements | hardware requirements for the resource | O | 0-1 |
| security-requirements | detailed security requirements during content ingestion and content distribution for the resource | O | 0-1 |

TABLE 5-continued

| Parameter Name | Description | Type | Cardinality |
|---|---|---|---|
| workflow-task-requirements | detailed requirements for optimizing the workflow and tasks by the Workflow Manager | O | 0-1 |
| resource-estimators | equations for estimating the resources by comparing to a baseline configuration | O | 0-1 |

For example, connectivity parameters may be included that describe connectivity between the MPE and another MPE (a target MPE). The connection-parameters may comprise or consist of the following: an id, a url, a forward object, and a return object. The objects are shown below in TABLE 6.

TABLE 6

| Name | Type | Cardinality |
|---|---|---|
| id | P | 1 |
| url | P | 0-1 |
| forward | O | 0-1 |
| return | O | 0-1 |

The id may be a target MPE's unique identifier among all MPEs. The url may be the target MPE's URL. The forward and backward objects may define the connection parameters between the MPE and the target MPE. That is, the forward object may define a connection from the MPE to the target MPE, and the return objection may define a connection from the target MPE to the MPE.

The forward and return objects may include parameters as defined below in TABLE 7.

TABLE 7

| Name | Type | Cardinality |
|---|---|---|
| min-delay | P | 0-1 |
| max-throughput | P | 0-1 |
| averaging-window | P | 0-1 |

These parameters (e.g. "min-delay," "max-throughput," "averaging-window") are defined in TABLE 3.

According to embodiments, a method for describing the connection characteristics between different cloud processing nodes as part of the capability discovery of a cloud node may be provided. The method may include the NBMP workflow manager 320 receiving and using NBMP MPE capabilities description, wherein a new set of parameters are provided within the MPE capabilities description to represent the maximum bandwidth and minimum latency in each direction between an MPE 350 and another MPE 350 in a cloud.

[Task Proximity Parameters]

A new set of parameters (task proximity parameters) may be implemented by the NBMP system 300 for each task (e.g. tasks 352). Each task may have an array of relative distance values that indicate the desired closeness to each media source 360 and/or media sink 370. The numbers may be relative and a smaller number may be a closer distance.

According to embodiments, the NBMP workflow manager 320 may receive, from the NBMP source 310 as a part of workflow description, the task proximity parameters that indicate the relative distance values.

If the tasks do not have any assigned proximity parameters, the NBMP workflow manager 320 may assign proximity values to each task based on the location of the task in the workflow. For example, the NBMP workflow manager 320 may use the number of connecting tasks as a measure for proxy. In this case, as an example, the tasks of FIG. 5 may have the distances shown below in TABLE 8.

TABLE 8

| Desired/Required Distance | Media Source | Media Sink |
|---|---|---|
| Task 1 (401) | 0 | 3 |
| Task 2 (402) | 0 | 3 |
| Task 3 (403) | 1 | 2 |
| Task 4 (404) | 2 | 1 |
| Task 5 (405) | 2 | 1 |
| Task 6 (406) | 3 | 0 |
| Task 7 (407) | 3 | 0 |
| Task 8 (408) | 3 | 0 |

[Resource Location of Task]

To document where each task is implemented, a new parameter may be added to NBMP General Descriptor to indicate the id of the resource (e.g. media source or media sink) in which the task is implemented. In particular, if a task is implemented in a media source or media sink, the id indicates that the task is implemented on the corresponding device/platform. TABLES 9 and 10 below describe examples of the parameters added to NBMP General Descriptor.

TABLE 9

| Parameter Name | Type | Cardinality |
|---|---|---|
| id | P | 1 |
| name | P | 1 |
| description | P | 1 |
| rank | P | 0-1 |
| mpeg-compatibility | P | 0-1 |
| published-time | P | 0-1 |
| priority | P | 0-1 |
| location | P | 0-1 |
| execution-time | P | 0-1 |
| input-ports | Array of object | 1 |
| output-ports | Array of object | 1 |
| is-group | P | 0-1 |
| state | P | 1 |

TABLE 10

| Parameter Name | Definition | Unit | Type | Valid range |
|---|---|---|---|---|
| location | Id of the resource that this Workflow/task is implemented. | N/A | string | N/A |

The same parameter may be used to signal the location of task implementation in a cloud platform (e.g. in an MPE 350). However, in this case, only the cloud platform and the associated NBMP workflow manager 320 may relate the id to the actual location of the cloud resource.

[Process of Split-Rendering]

Figure 6:
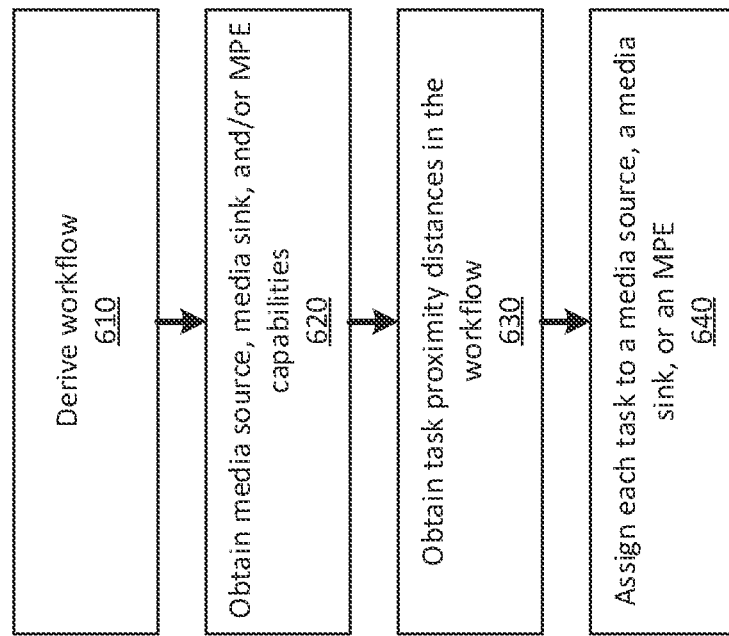
FIG. 6 is a block diagram of an example of a split rendering process according to embodiments.

With reference to FIGS. 3 and 6, a process performed by the NBMP workflow manager 320 for split-rendering of a workflow is described below.

The NBMP workflow manager 320 may derive the required workflow (610). For example, the NBMP workflow manager 320 may derive workflow based on a workflow description document from the NBMP source 310.

The NBMP workflow manager 320 may obtain the capabilities of the media source, the media sink, and/or the MPE(s) 350 (620). For example, the NBMP workflow manager 320 may send requests to one or more from among the media source 360, MPE(s) 350, and media sink 360, and may receive one or more capabilities description documents, via one or more APIs (e.g. API 394, API 395, and/or API 396). The NBMP workflow manager 320 may determine the capabilities of the media source, the media sink, and/or the MPE(s) 350 based on the one or more capabilities description documents.

The NBMP workflow manager 320 may acquire the proximity distances of the tasks in the workflow (630). For example, according to embodiments, the NBMP workflow manager 320 may receive the proximity distances from the NBMP source 310 as a part of workflow description (e.g. as a part of a workflow description document). According to embodiments, the NBMP workflow manager 320 may receive a workflow description document (WDD) from the NBMP source 310, and then receive an updated WDD from the NBMP source 310 that includes the proximity distances for each task. Alternatively, according to embodiments, the NBMP workflow manager 320 may derive the proximity distance for each task based on an internal scheme and workflow topology.

The NBMP workflow manager 320 may use the obtained capabilities for each media source 360, media sink 370, and/or MPE(s) 350 and the proximity distance of each task to assign each task to an element (e.g. a media source, a media sink, or to the cloud/network resource) (370). For example, the NBMP workflow manager 320 may assign each task such that the following conditions are met: (i) the assigned element is capable of performing the task and satisfy the task requirements, and (ii) the task has the smallest distance to the media source/sink among media sources and sinks that are capable of performing the task. According to embodiments, the NBMP workflow manager 320 may use the obtained capabilities for each media source 360, media sink 370, and/or MPE(s) 350 and the proximity distance of each task to iterate the assignment of each task to an element so as to obtain the most optimized configuration.

[Workflow Reconfiguration]

Figure 7:
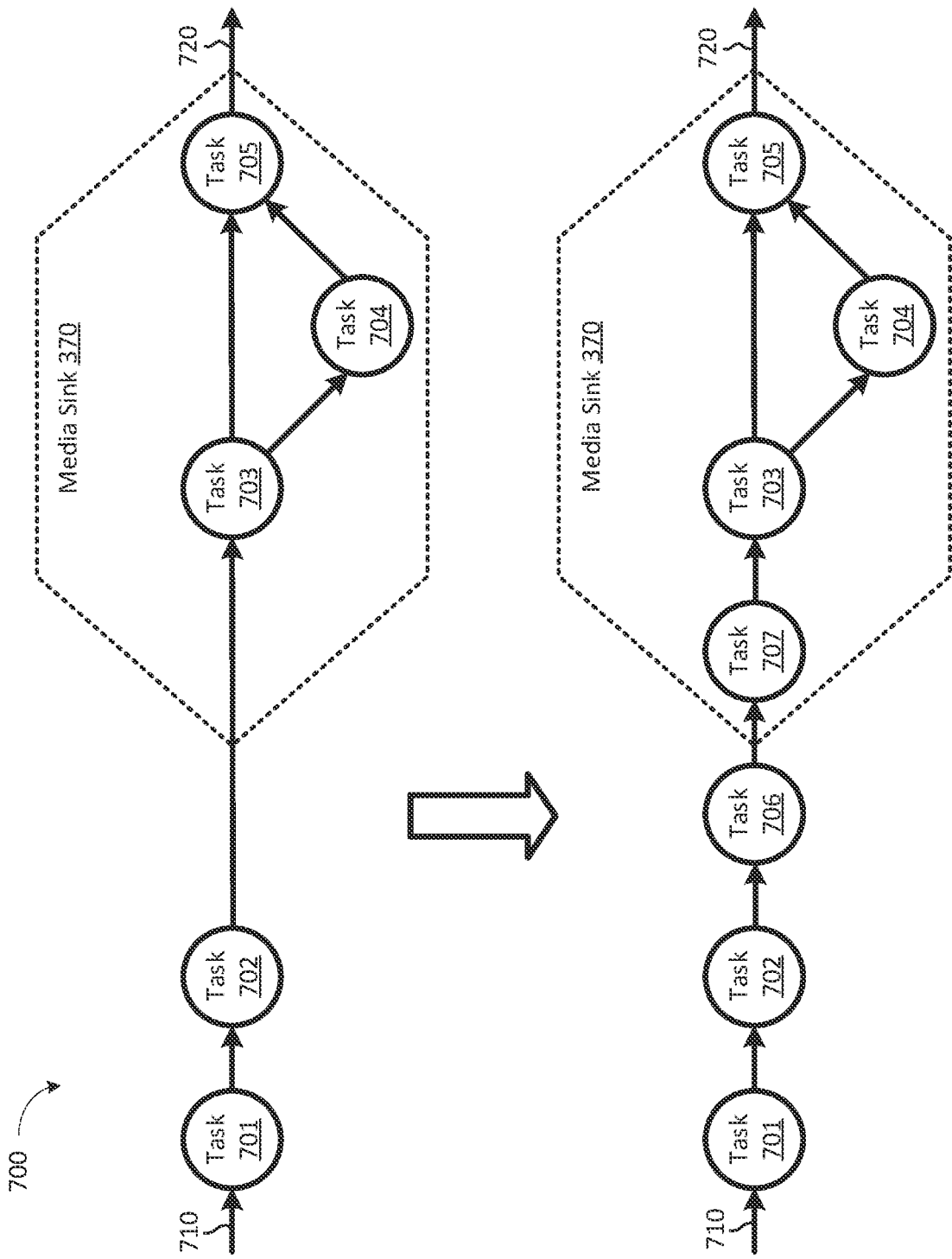
FIG. 7 is a diagram of an example of reconfiguring an NBMP workflow according to embodiments.
Figure 8:
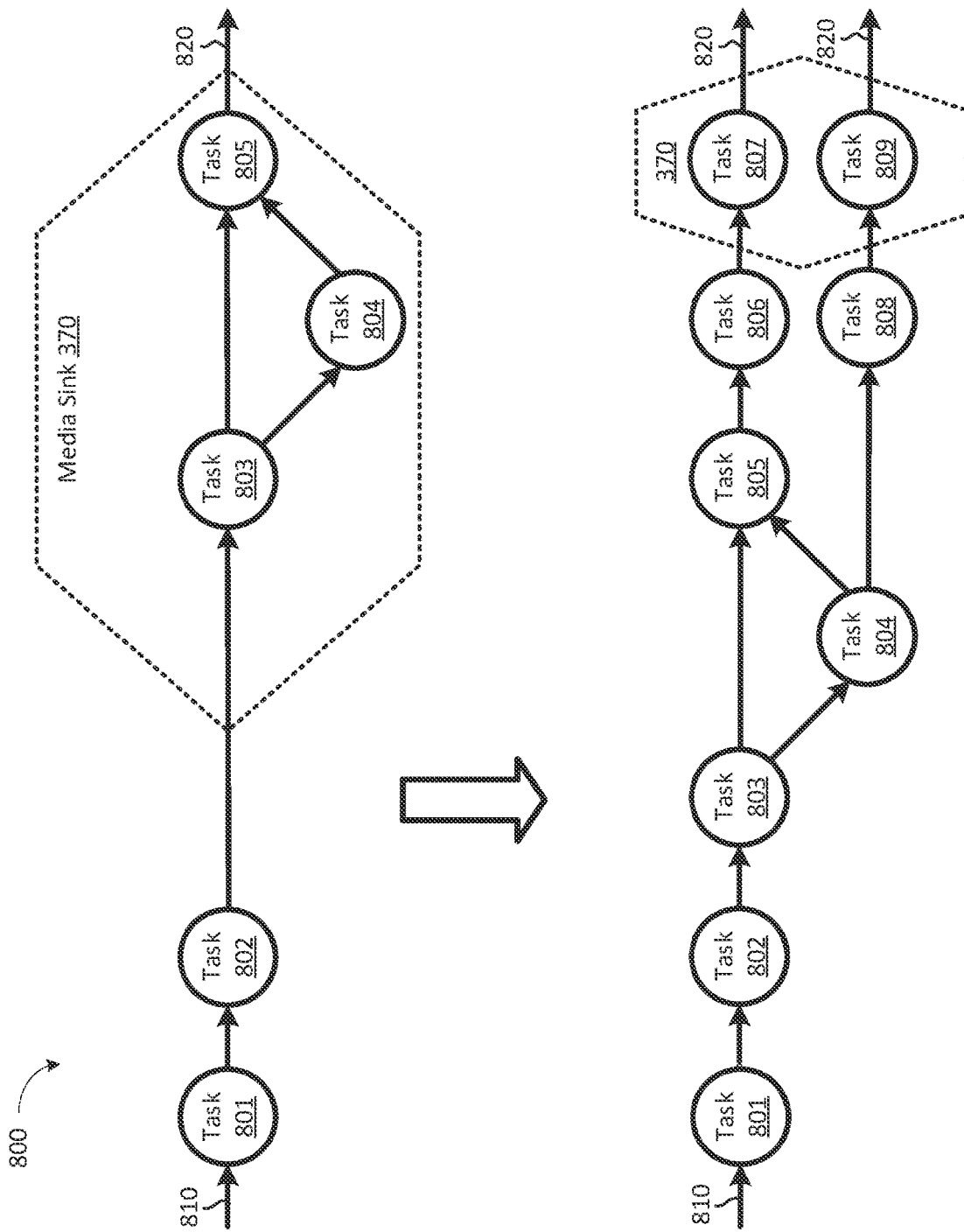
FIG. 8 is a diagram of an example of reconfiguring an NBMP workflow according to embodiments.

Depending on the workflow and the media source/sink capabilities, the NBMP workflow manager 320 may reconfigure a workflow by replacing a part of the workflow or adding intermediate tasks in the workflow. Such a reconfiguration may increase efficiency of the workflow. The reason can be that a media source 360 or a media sink 370 may have built-in functions that are more efficient, so the delivery format to them might be different than the workflow output format, or the battery constraint in a device may force the workflow to be replaced with a different workflow. With reference to FIGS. 7-8, two examples of reconfiguration are described below.

FIG. 7 illustrates a workflow 700 that initially includes tasks 701-705 that may be split between the MPE(s) 350 (refer to FIG. 3) and the media sink 370, and are associated with an input 710 and provide an output 720. As the media sink 370 connection bandwidth reduces, the workflow can work with the required throughput. The NBMP workflow manager 320 may identify the reduced connection bandwidth of the media sink 370 and may then update the workflow by adding task 706 and task 707. Task 707 may be a built-in decompression function in the media sink 370 and task 706 may be a compression function in the MPE 350, which may be a part of an edge network. Using task 706 as the compression function on the edge network, the bandwidth between task 706 and task 707 is reduced enough to fit in the available bandwidth to the media sink 370.

Referring to FIG. 8, an example of reconfiguring workflow is shown for the use-case in which the media sink 370 (e.g. a sink device) is low in battery. FIG. 8 illustrates a workflow 800 that initially includes tasks 801-805 that are split between an MPE(s) 350 (e.g. a cloud node) and the media sink 370, and are associated with an input 810 and provide an output 820. Since tasks 803-805 may require significant processing power, to save the battery of the media sink 370, the workflow is reconfigured by the NBMP workflow manger 320 by moving tasks 803-805 to the cloud and adding compression tasks 806 and 808 so that used bandwidth to deliver the content to the media sink 370 is reasonable. Tasks 807 and 809 may be built-in efficient decompression functions that decompress the input streams and render the results as outputs 820.

[Source and Sink System Events]

The media source and media sink descriptions, obtained by the NBMP workflow manager 320, may include a listing of media source/sink system events. These events typically are the following:

1. Reduced processing power from a certain threshold
2. Reduced available memory from a certain threshold
3. Reduced available disk space from a certain threshold
4. Reduced battery level from a certain threshold The NBMP workflow manager 350 can set up notifications for all or a subset of the above system events using a notification descriptor. If such an event occurs, the NBMP workflow manager may receive a notification and may reconfigure the workflow to address the event based on receiving the notification. The NBMP workflow manager 350 may set up the notifications based on the listing of media source/sink system events obtained.

[Split Rendering Between Different Network Elements or Different Cloud Nodes]

The features and processes described above may be implemented by the NBMP system 300 to split workflow implementation among network elements and edge computing resources, and between different nodes of a cloud platform or between multiple-cloud platforms.

[Example Computer Code]

According to embodiments of the present disclosure, at least one processor with memory storing computer code may be provided. The computer code may be configured to, when executed by the at least one processor, perform any number of aspects of the present disclosure.

Figure 9:
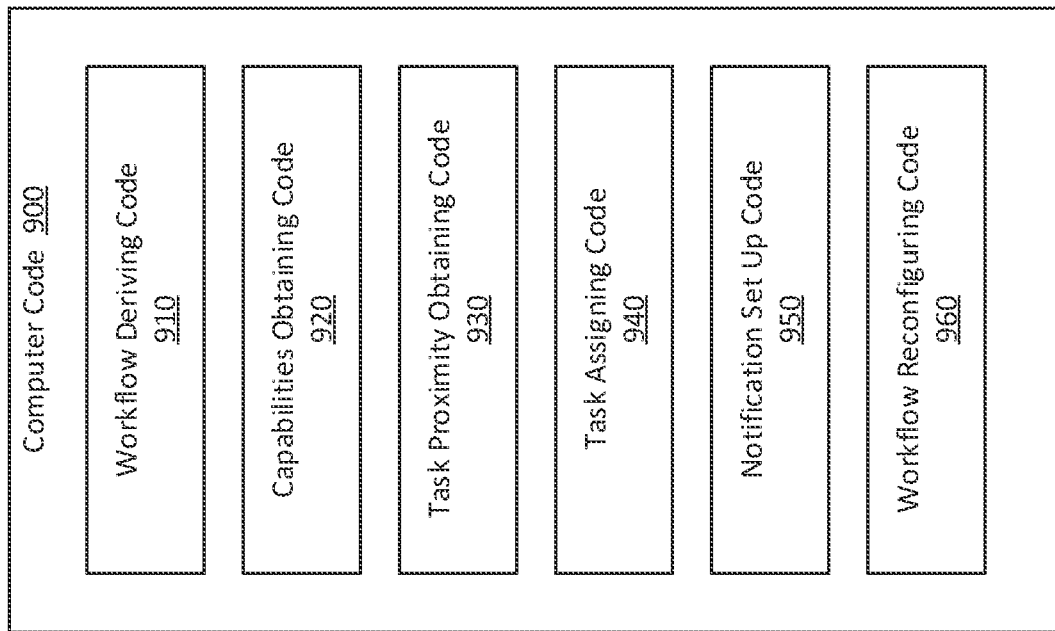
FIG. 9 is a block diagram of computer code according to embodiments.

For example, with reference to FIG. 9, computer code 900 may be implemented in the NBMP system 300. For example, the computer code may be stored in memory of the NBMP workflow manager 320 and may be executed by at least one processor of the NBMP workflow manager 320. The compute code may comprise, for example, workflow deriving code 910, capabilities obtaining code 920, task proximity obtaining code 930, task assigning code 940, notification set up code 950, and workflow reconfiguring code.

The workflow deriving code 910, the capabilities obtaining code 920, the task proximity obtaining code 930, and the task assigning code 940 may be configured to cause the NBMP workflow manager 320 to perform the aspects of the process described above with reference to FIG. 6, respectively.

The notification set up code 950 may be configured to cause the NBMP workflow manager 320 to set up notifications based on a listing of media source/sink system events obtained, such that the NBMP workflow manager 320 receives a notification in a case a particular media source/sink system event (e.g. a change of resources) occurs.

The workflow reconfiguring code 960 may be configured to cause the NBMP workflow manager 320 to reconfigure the workflow (e.g. add or remove tasks, and/or re-divide tasks between the media source 360, media sink 370, and the MPE(s) 350. For example, the workflow reconfiguring code 960 may be configured to cause the NBMP workflow manager 320 to reconfigure the workflow based on receiving the notification. According to embodiments, the reconfiguring of the workflow may be dynamic and based on changes (e.g. reduction) of resources associated with one or more from among the media source 360, media sink 370, and the MPE(s) 350, so as to accommodate the change of resources. The resources may be, for example, available cpu, gpu, memory, bandwidth, disk, or power of the media source 360, the media sink 370, or an MPE 350. According to embodiments, the reconfiguring of the workflow may be dynamic and may be based on a change in availability of MPEs 350. The reconfiguring may include, for example, re-dividing at least a portion of workflow between the MPEs 350 based on their availability.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:
   deriving a media processing workflow; and
   assigning a plurality of workflow tasks of the media processing workflow among a media sink, a media source, and at least one media processing entity,
   wherein a first subset of the plurality of the workflow tasks are assigned to the media source,
   wherein a second subset of the plurality of the workflow tasks are assigned to the media sink, and
   wherein a third subset of the plurality of the workflow tasks are assigned to the at least one media processing entity.

2. The method of claim 1, further comprising:
   receiving capabilities information from at least one from among the media source and the media sink, wherein the capabilities information describes resources of the at least one from among the media source and the media sink that are available,
   wherein the assigning comprises assigning the workflow tasks based on the capabilities information.

3. The method of claim 2, further comprising:
   reconfiguring the media processing workflow based on a change of at least one of the resources of the at least one from among the media source and the media sink.

4. The method of claim 3, further comprising:
   receiving an event-driven notification from the media source or the media sink in a case where the at least one of the resources associated with the at least one from among the media source and the media sink is reduced below a predetermined threshold,
   wherein the reconfiguring the media processing workflow accommodates the at least one of the resources that is reduced.

5. The method of claim 1, wherein
   the at least one media processing entity includes a plurality of network elements or a plurality of cloud nodes,
   the assigning comprises dividing the third subset of the plurality of the workflow tasks of the media processing workflow between the plurality of network elements or the plurality of cloud nodes based on capabilities of the plurality of network elements or of the plurality of cloud nodes, and
   the method further comprises dynamically reconfiguring the media processing workflow based on a change in availability of the plurality of network elements or of the plurality of cloud nodes.

6. The method of claim 1, further comprising:
   receiving capabilities information from the at least one media processing entity, wherein the capabilities information describes available resources of the at least one media processing entity,
   wherein the assigning comprises assigning the workflow tasks based on the capabilities information.

7. The method of claim 6, wherein the at least one media processing entity includes at least one cloud node.

8. The method of claim 6, wherein
   the at least one media processing entity includes a plurality of cloud elements, network elements, or edge elements, and
   the capabilities information includes at least one parameter that describes a connection characteristics between two of the plurality of cloud elements, network elements, or edge elements.

9. The method of claim 8, wherein the plurality of cloud elements, network elements, or edge elements is a plurality of cloud nodes.

10. The method of claim 8, wherein the at least one parameter is a set of parameters that indicate a maximum bandwidth and a minimum latency in two directions between the two of the plurality of cloud elements, network elements, or edge elements.

11. A workflow manager of a media system, the workflow manager comprising:
at least one processor; and
memory comprising computer code, the computer code comprising:
workflow deriving code configured to cause the at least one processor to derive a media processing workflow; and
task assigning code configured to cause the at least one processor to assign a plurality of workflow tasks of the media processing workflow among a media sink, a media source, and at least one media processing entity,
wherein a first subset of the plurality of the workflow tasks are assigned to the media source,
wherein a second subset of the plurality of the workflow tasks are assigned to the media sink, and
wherein a third subset of the plurality of the workflow tasks are assigned to the at least one media processing entity.

12. The workflow manager of claim 11, wherein
the task assigning code is configured to cause to the at least one processor to assign the workflow tasks based on capabilities information that is received from at least one from among the media source and the media sink, and
the capabilities information describes resources of the at least one from among the media source and the media sink that are available.

13. The workflow manager of claim 12, wherein the computer code further comprises:
workflow reconfiguring code configured to cause the at least one processor to reconfigure the media processing workflow based on a change of at least one of the resources of the at least one from among the media source and the media sink.

14. The workflow manager of claim 13, wherein
the workflow reconfiguring code is configured to cause the at least one processor to reconfigure the media processing workflow to accommodate reduction of the at least of the resources based on receiving an event-driven notification from the media source or the media sink in a case where the at least one of the resources associated with the at least one from among the media source and the media sink is reduced below a predetermined threshold.

15. The workflow manager of claim 14, wherein
the at least one media processing entity comprises a plurality of network elements or a plurality of cloud nodes,
the task assigning code is configured to cause the at least one processor to divide the third subset of the plurality of the workflow tasks of the media processing workflow between the plurality of network elements or the plurality of cloud nodes based on capabilities of the plurality of network elements or of the plurality of cloud nodes, and
the workflow reconfiguring code is configured to cause the at least one processor to dynamically reconfigure the media processing workflow based on a change in availability of the plurality of network elements or of the plurality of cloud nodes.

16. The workflow manager of claim 15, wherein
the task assigning code is configured to cause the at least one processor to assign the workflow tasks based on capabilities information that is received from the at least one media processing entity, and
the capabilities information describes available resources of the at least one media processing entity.

17. The workflow manager of claim 16, wherein the at least one media processing entity comprises at least one cloud node.

18. The workflow manager of claim 16, wherein
the at least one media processing entity comprises a plurality of cloud elements, network elements, or edge elements, and
the capabilities information includes at least one parameter that describes a connection characteristics between two of the plurality of cloud elements, network elements, or edge elements.

19. The workflow manager of claim 18, wherein the at least one parameter is a set of parameters that indicate a maximum bandwidth and a minimum latency in two directions between the two of the plurality of cloud elements, network elements, or edge elements.

20. A non-transitory computer-readable medium storing computer code that is configured to, when executed by at least one processor that implements a workflow manager of a media system, cause the at least one processor to:
derive a media processing workflow; and
assign a plurality of workflow tasks of the media processing workflow among a media sink, a media source, and a at least one media processing entity,
wherein a first subset of the plurality of the workflow tasks are assigned to the media source,
wherein a second subset of the plurality of the workflow tasks are assigned to the media sink, and
wherein a third subset of the plurality of the workflow tasks are assigned to the at least one media processing entity.

* * * * *